United States Patent
Man

(10) Patent No.: US 7,248,752 B2
(45) Date of Patent: Jul. 24, 2007

(54) METHODS AND APPARATUS FOR CONVERTING THE RESOLUTION OF BINARY IMAGE DATA

(75) Inventor: Lai Chee Man, San Mateo, CA (US)

(73) Assignee: Electronics For Imaging, Inc., Foster City, CA (US)

(*) Notice: Subject to any disclaimer, the term of this patent is extended or adjusted under 35 U.S.C. 154(b) by 777 days.

(21) Appl. No.: 10/650,279

(22) Filed: Aug. 27, 2003

(65) Prior Publication Data

US 2005/0047680 A1 Mar. 3, 2005

(51) Int. Cl.
*G06K 9/32* (2006.01)
*G06K 9/48* (2006.01)

(52) U.S. Cl. ...................... 382/299; 382/300

(58) Field of Classification Search ............... 382/299, 382/300, 266, 267, 268, 269, 199, 205
See application file for complete search history.

(56) References Cited

U.S. PATENT DOCUMENTS

| | | | |
|---|---|---|---|
| 5,553,171 A * | 9/1996 | Lin et al. ................... 382/299 |
| 5,661,824 A | 8/1997 | Allebach et al. | |
| 6,356,670 B1 | 3/2002 | Keithley et al. | |
| 6,477,282 B1 | 11/2002 | Ohtsuki et al. | |
| 6,757,431 B2 * | 6/2004 | Loce et al. ................. 382/209 |
| 2003/0007702 A1 * | 1/2003 | Aoyama et al. ............ 382/300 |

OTHER PUBLICATIONS

A. Imiya et al., "Inverse Quantization of Digital Binary Images for Resolution Conversion," Scale-Space and Morphology in Computer Vision—Third International Conference, Scale-Space 2001, vol. 2106, Jul. 7, 2001, pp. 426-434, XP002320439, Vancouver.

J. Allebach et al., "Edge-Directed Interpolation," Proceedings of the International Conference on Image Processing (ICIP), Lausanne, Sep. 16-19, 1996, New York, IEEE, US, vol. 3, pp. 707-710, XP000704112.

* cited by examiner

*Primary Examiner*—Yon J. Couso
(74) *Attorney, Agent, or Firm*—James Trosino

(57) ABSTRACT

Methods and apparatus are provided for converting binary image data at a first resolution to binary image data at a second resolution, the methods including detecting the edges of the binary image data, sampling a corresponding point on or substantially near each of the edges, fitting a curve between the sampled points, and re-sampling the curve at the second resolution.

15 Claims, 4 Drawing Sheets

METHODS AND APPARATUS FOR CONVERTING THE RESOLUTION OF BINARY IMAGE DATA

FIELD OF THE INVENTION

This invention relates to digital images, and more particularly to methods and apparatus for converting the resolution of binary image data.

BACKGROUND

Digital print output devices, such as copiers, printers, and printing presses, often operate in a binary mode (i.e., a printer typically either deposits colorants or ink on a substrate or does not deposit colorants or ink on the substrate at a specific location). The resolution of a digital printer is typically expressed in dots per inch ("dpi"), which describes the number of locations per inch in which the printer can either print a dot, or not print a dot. For example, a 600 dpi laser printer can print (or not print) 600 dots per linear inch, whereas a 2400 dpi image setter can print (or not print) 2400 dots per linear inch.

In many instances, a user may desire to print a digital image on a particular printer, but the resolution of the digital image differs from the printer's resolution. For example, many electronic scanners and software document creation applications operate at a medium resolution of 300 dpi, whereas many conventional printers operate at 600 dpi or higher. Thus, it is often necessary to convert the resolution of image data from a first resolution to a second resolution.

One previously known technique for image resolution conversion involves interpolating between neighboring image values at a first resolution to obtain image values at a second resolution. For binary image data, in which the data only may have values of "0" or "1," however, such techniques are difficult to implement. For example, Keithley et al. U.S. Pat. No. 6,356,670 ("Keithley") describes methods for converting diffused black-and-white images to lower spatial resolutions. In particular, binary image data are created in a first array at a first resolution, the image data are converted to scaled image values in a second array at a second resolution by interpolating between neighboring image values in the first array, and then the scaled values are diffused to produce binary values in the second array. Keithley's technique is fairly complex, and appears to be limited to converting from a higher resolution to a lower resolution.

Other previously known techniques are limited to integer or small ratio conversion. For example, such techniques may be used to convert image data at 300 dpi to 400 or 600 dpi, but may not be used to convert the data to 720 dpi. In many instances, however, it may be useful to convert the resolution of binary image data using arbitrary conversion ratios.

In view of the foregoing, it would be desirable to provide methods and apparatus for simply converting binary image data at a first resolution to binary image data at a second resolution.

It also would be desirable to provide methods and apparatus that may be used to convert binary image data at a first resolution to binary image data at a second resolution that may be higher or lower than the first resolution.

It also would be desirable to provide methods and apparatus for converting binary image data at a first resolution to binary image data at a second resolution using arbitrary conversion ratios.

SUMMARY

In view of the foregoing, it is an object of this invention to provide methods and apparatus for simply converting binary image data at a first resolution to binary image data at a second resolution.

It also is an object of this invention to provide methods and apparatus that may be used to convert binary image data at a first resolution to binary image data at a second resolution that may be higher or lower than the first resolution.

It further is an object of this invention to provide methods and apparatus for converting binary image data at a first resolution to binary image data at a second resolution using arbitrary conversion ratios.

These and other objects of this invention are accomplished by providing methods and apparatus for converting binary image data at a first resolution to binary image data at a second resolution, the methods including detecting the edges of the binary image data, sampling a corresponding point on or substantially near each of the edges, fitting a curve between the sampled points, and re-sampling the curve at the second resolution.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which.

DETAILED DESCRIPTION

The present invention provides methods and apparatus for converting binary image data at a first resolution to binary image data at a second resolution, the methods including detecting the edges of the binary image data, sampling a corresponding point on or substantially near each of the edges, fitting a curve between the sampled points, and re-sampling the curve at the second resolution.

Figure 1:
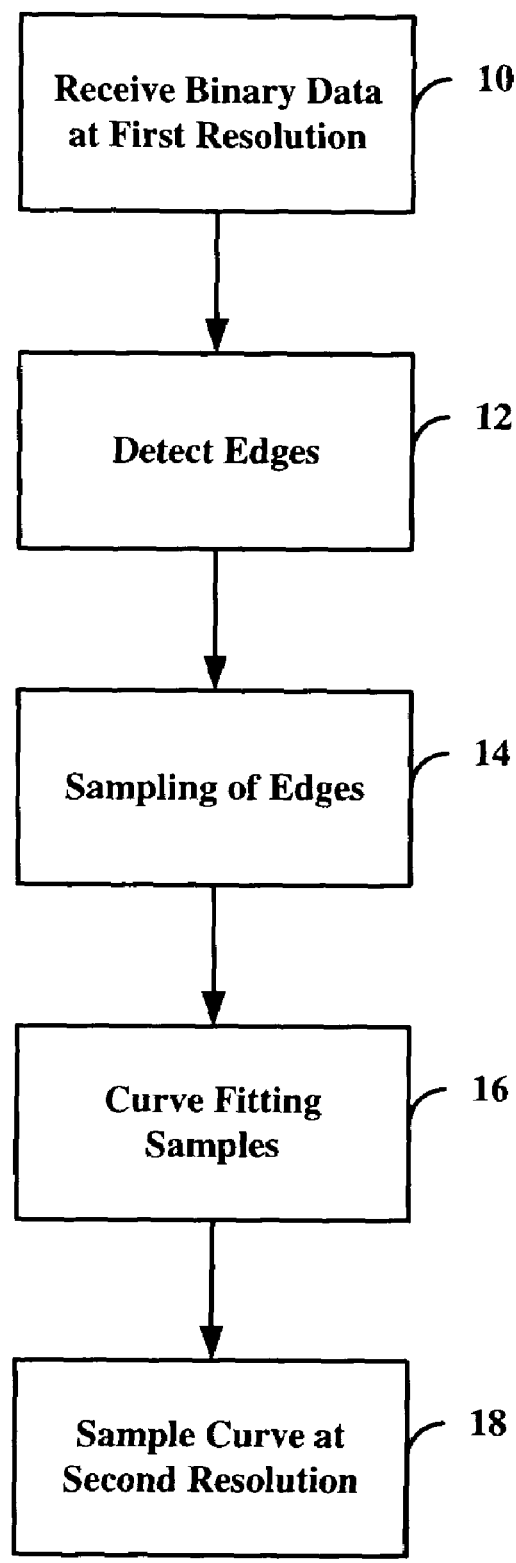
FIG. 1 is a block diagram of an exemplary method in accordance with this invention.
Figure 2:
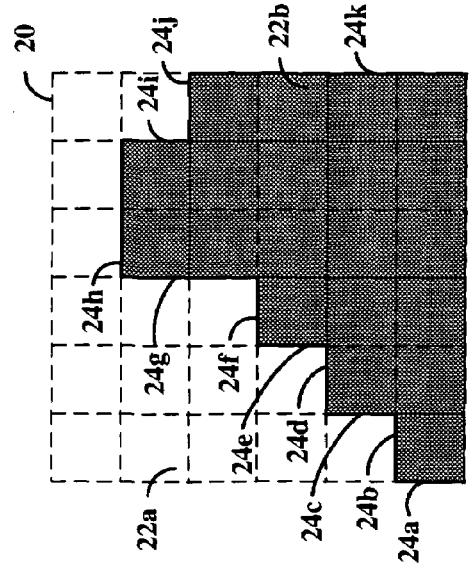
FIG. 2 is a schematic diagram of exemplary binary data that may be used with methods and apparatus in accordance with this invention.

Referring to FIG. 1, a first illustrative embodiment of methods in accordance with this invention is described. At step 10, binary image data at a first resolution are received. The binary image data may be provided from any source of binary image data, such as a scanner, facsimile machine, digital copier, computer memory, or other similar source of binary image data. FIG. 2 illustrates an exemplary portion of binary image data that may be used with methods and apparatus in accordance with this invention. Binary image data 20 includes an array of binary data dots 22, which may have values of either "0" (illustrated as white squares, such as dot 22*a*) or "1" (illustrated as shaded squares, such as dot 22*b*). One or more edges 24 are formed at each border between adjacent white and shaded squares. Eleven edges 24*a*-24*k* are shown in FIG. 2 between adjacent white and shaded squares.

The array of binary image data 20 shown in FIG. 2 may form a complete image, or may be a small portion of a much larger image. Binary image data 20 has a first resolution, typically expressed in the number of dots per unit length. For example, if the 6×6 array of binary image data 20 corresponds to a one inch by one inch portion of an image, the first resolution equals 6 dpi in each of the horizontal and vertical directions. Persons of ordinary skill in the relevant art will understand that the first resolution may have other values, and may be expressed in terms of other units of measure.

Referring again to FIG. 1, at step 12, the edges 24 of binary image data 20 are detected. This step may be performed simply by detecting locations where binary image data changes value (i.e., from "0" to "1" or "1" to "0"). Next, at step 14, samples of each of the edges detected in step 12 are determined. In particular, a point on each of edges 24*a*-24*k* may be selected as sampling points for the edges. For example, each of edges 24*a*-24*k* have a corresponding point 26*a*-26*k*, respectively, at substantially the center of the edge that may be selected as the sampling points for each of the edges. Persons of ordinary skill in the art will understand that other points on or substantially near edges 24*a*-24*k* may alternatively be selected.

Figure 3:
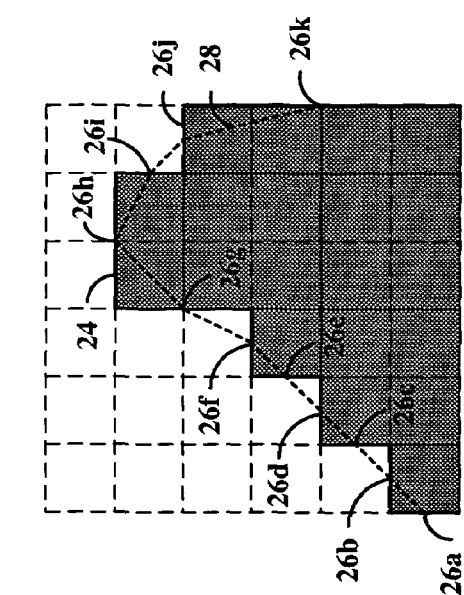
FIG. 3 is a schematic diagram of an exemplary curve fit of the binary data of FIG. 2 in accordance with this invention.

Next, at step 16, a curve is fit to the samples identified in step 14. Any conventional curve-fitting technique may be used. An exemplary curve-fitting technique that may be used with methods and apparatus in accordance with this invention is illustrated in FIG. 3. A curve 28 (shown in dashed line) may be fit to sampling points 26*a*-26*k* by drawing as a series of straight line segments that connect successive sampling points 26*a*-26*k*. Such a curve-fitting technique is simple and convenient to implement. Persons of ordinary skill in the art will understand that other curve-fitting techniques (e.g., spline curve fitting) may be used.

Referring again to FIG. 1, at step 18, curve 28 is sampled at a second resolution, the desired output resolution. In particular, curve 28 is sampled using 1 bit quantization to provide binary data at the second resolution. Any conventional 1-bit quantization technique may be used. For example, if the center of each square is less than the value of the curve 28 at that point, the square can be set to a value of "0." If, however, the center of each square is greater than or equal to the value of the curve 28 at that point, the square can be set to a value of "1." Persons of ordinary skill in the art will understand that other quantization techniques also may be used. For example, rather than comparing the midpoint of each square, the fractional area above and below curve 28 may be used to determine the binary output value for that square.

Figure 4:
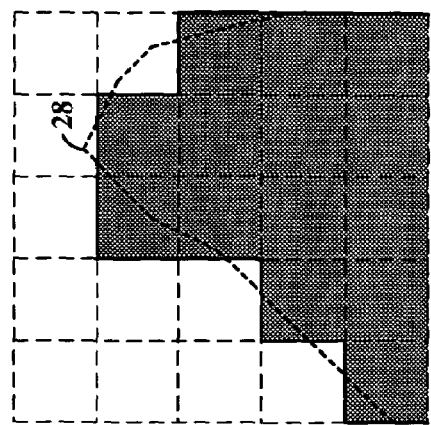
FIG. 4 is an exemplary re-sampling of the curve fit of FIG. 3 in accordance with this invention.
Figure 7:
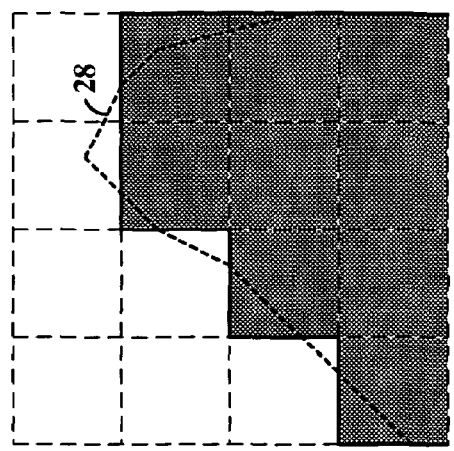
FIG. 7 is another exemplary re-sampling of the curve fit of FIG. 3 in accordance with this invention.
Figure 6:
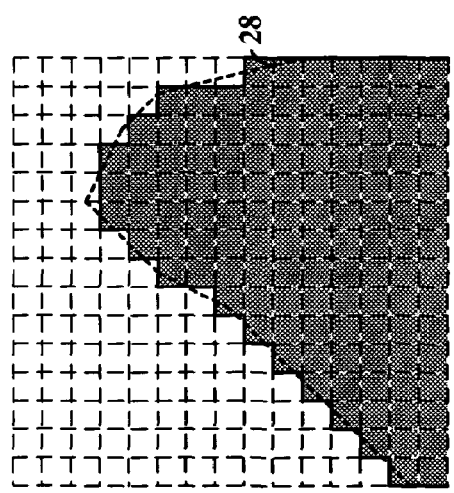
FIG. 6 is another exemplary re-sampling of the curve fit of FIG. 3 in accordance with this invention.
Figure 5:
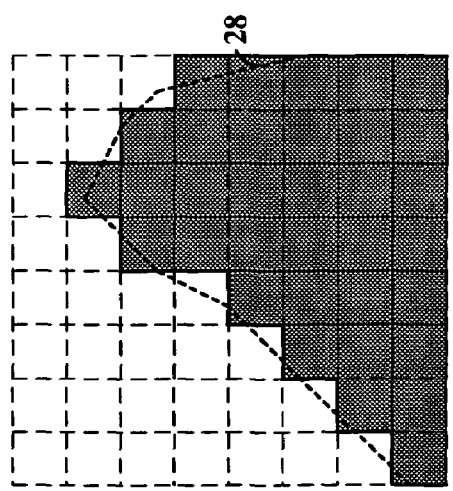
FIG. 5 is an alternative exemplary re-sampling of the curve fit of FIG. 3 in accordance with this invention.

FIGS. 4-7 illustrate several examples of re-sampling in accordance with this invention. FIG. 4 illustrates curve 28 sampled at a second resolution of 5 dpi, FIG. 5 illustrates curve 28 sampled at a second resolution of 8 dpi, FIG. 6 illustrates curve 28 sampled at a second resolution of 15 dpi, and FIG. 7 illustrates curve 28 sampled at a second resolution of 4 dpi. In each of the illustrated examples, the binary output value for each square is determined by comparing the center value of each square to the value of curve 28 at that point. Thus, unlike previously known resolution conversion techniques, methods in accordance with this invention may be used convert binary image data from a first resolution to a second resolution that is either higher or lower than the first resolution. Further, methods in accordance with this invention may be used to convert binary image data from a first resolution to a second resolution that is an integer or non-integer multiple of the first resolution.

Figure 8:
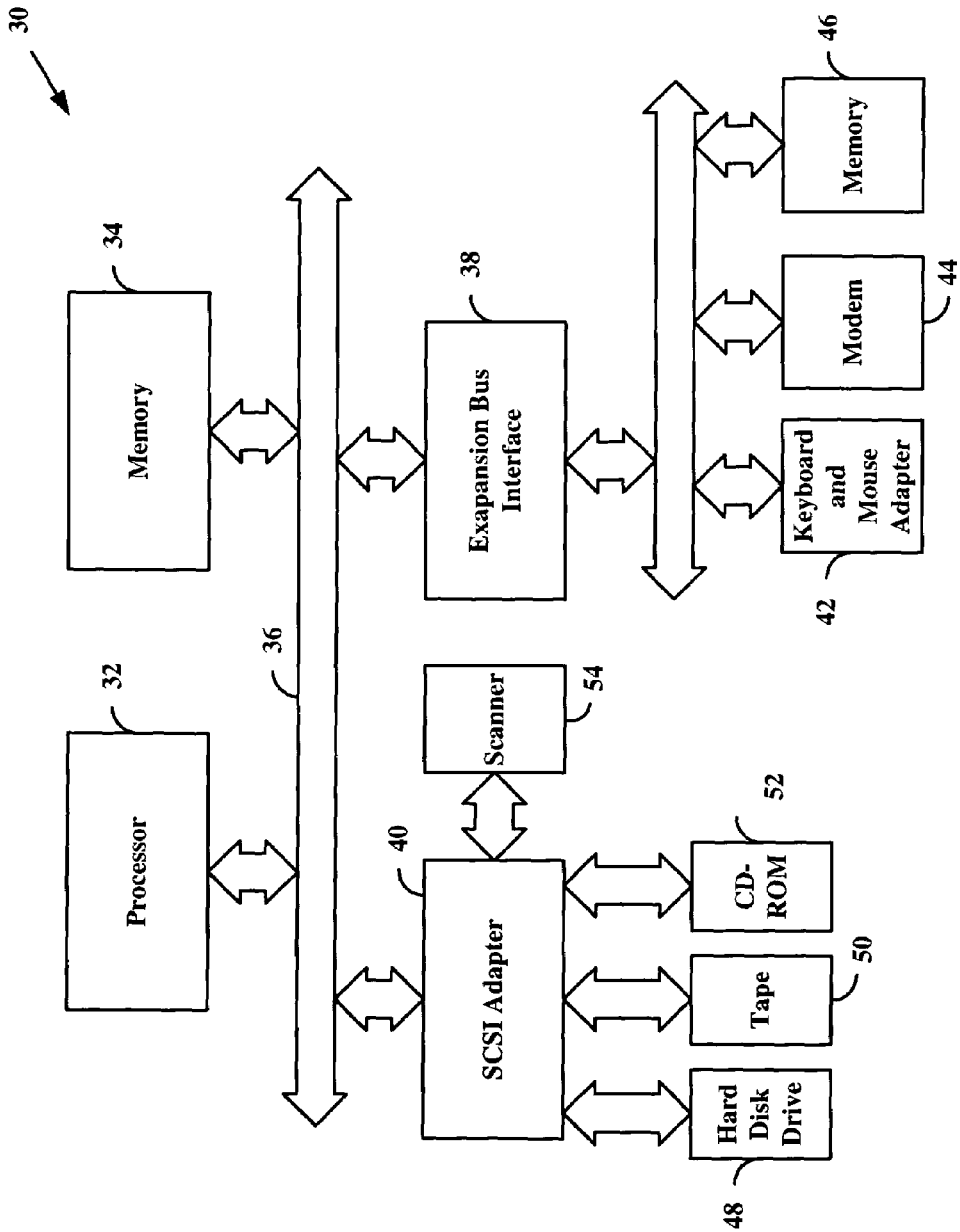
FIG. 8 is a block diagram of an exemplary apparatus in accordance with this invention.

Referring now to FIG. 8, an exemplary apparatus in accordance with this invention is described. In particular, data processing system 30 is an example of a computer in which code or instructions implementing processes in accordance with this invention may be located. Data processing system 30 includes processor 32 and main memory 34, coupled together via communication bus 36. Processor 32 may be a conventional microprocessor, special purposes microprocessor, application specific integrated circuit, or other similar computer processor. Main memory 34 may be read only memory, random access memory, optical memory, or other similar memory. Communication bus 36 may be any conventional computer communication bus, such as a peripheral component interconnect bus, accelerated graphics port bus, industry standard architecture bus or other similar bus. Data processing system 30 also may include expansion bus interface 38 and SCSI host bus adapter 40. Expansion bus interface 38 provides a connection for a keyboard and mouse adapter 42, modem 44, and additional memory 46. SCSI host bus adapter 40 provides a connection for hard disk drive 48, tape drive 50, CD-ROM drive 52 and scanner 54.

An operating system runs on processor 32 and is used to coordinate and provide control of various components within data processing system 30. The operating system may be a commercially available operating system such as Microsoft Windows. An object oriented programming system such as Java may run in conjunction with the operating system and provides calls to the operating system from Java programs or applications executing on data processing system 30. Instructions for the operating system, the object-oriented programming system, and applications or programs are located on storage devices, such as hard disk drive 48, and may be loaded into main memory 34 for execution by processor 32.

Those of ordinary skill in the art will appreciate that the hardware in FIG. 8 may vary depending on the implementation. Other internal hardware or peripheral devices, such as flash ROM (or equivalent nonvolatile memory) or optical disk drives and the like, may be used in addition to or in place of the hardware depicted in FIG. 8. Data processing system 30 may be configured as a network computer, stand-alone computer, notebook computer, hand held computer, personal digital assistant, or other similar data processing system. Processor 32 may be used to perform processes in accordance with this invention using computer implemented instructions, which may be located in a memory such as, for example, main memory 34, memory 46, or in one or more peripheral devices 48-52.

The foregoing merely illustrates the principles of this invention, and various modifications can be made by persons of ordinary skill in the art without departing from the scope and spirit of this invention.

I claim:

1. A method for converting binary image data at a first resolution to binary image data at a second resolution, the method comprising:

detecting a plurality of edges of the binary image data;

sampling a corresponding point at substantially the midpoint of each of the edges;

fitting a curve between the sampled points; and re-sampling the curve at the second resolution.

2. The method of claim 1, wherein the first resolution is less than the second resolution.

3. The method of claim 1, wherein the first resolution is greater than the second resolution.

4. The method of claim 1, wherein the first resolution is an integer multiple of the second resolution.

5. The method of claim 1, wherein the first resolution is a non-integer multiple of the second resolution.

6. A method for converting binary image data at a first resolution to binary image data at a second resolution, the method comprising:

detecting a plurality of edges of the binary image data;

sampling a corresponding point substantially near each of the edges;

fitting a curve by consecutively connecting a plurality of straight line segments between the sampled points; and re-sampling the curve at the second resolution.

7. The method of claim 6, wherein the first resolution is less than the second resolution.

8. The method of claim 6, wherein the first resolution is greater than the second resolution.

9. The method of claim 6, wherein the first resolution is an integer multiple of the second resolution.

10. The method of claim 6, wherein the first resolution is a non-integer multiple of the second resolution.

11. A method for converting binary image data at a first resolution to binary image data at a second resolution, the method comprising:

detecting a plurality of edges of the binary image data;

sampling a corresponding point substantially near each of the edges;

fitting a curve between the sampled points; and re-sampling the curve at the second resolution by comparing a value of the curve with a midpoint of a square at the second resolution.

12. The method of claim 11, wherein the first resolution is less than the second resolution.

13. The method of claim 11, wherein the first resolution is greater than the second resolution.

14. The method of claim 11, wherein the first resolution is an integer multiple of the second resolution.

15. The method of claim 11, wherein the first resolution is a non-integer multiple of the second resolution.

\* \* \* \* \*